US009267081B2

(12) United States Patent
Viswanadham et al.

(10) Patent No.: US 9,267,081 B2
(45) Date of Patent: Feb. 23, 2016

(54) CATALYST AND PROCESS FOR THE CONVERSION OF BIO-ETHANOL INTO GASOLINE

(75) Inventors: Nagabhatla Viswanadham, Uttarakhand (IN); Saxena Sandeep Kumar, Uttarakhand (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 0 days.

(21) Appl. No.: 13/619,608

(22) Filed: Sep. 14, 2012

(65) Prior Publication Data

US 2014/0081063 A1    Mar. 20, 2014

(51) Int. Cl.
| | |
|---|---|
| *C07C 1/20* | (2006.01) |
| *C07C 1/24* | (2006.01) |
| *C10G 3/00* | (2006.01) |
| *C10L 3/12* | (2006.01) |
| *B01J 29/40* | (2006.01) |
| *B01J 35/02* | (2006.01) |
| *B01J 37/00* | (2006.01) |

(52) U.S. Cl.
CPC . *C10G 3/49* (2013.01); *B01J 29/40* (2013.01); *C10L 3/12* (2013.01); *B01J 35/023* (2013.01); *B01J 37/0009* (2013.01); *B01J 2229/42* (2013.01); *C10G 2300/1011* (2013.01); *C10G 2300/202* (2013.01); *C10G 2400/02* (2013.01); *C10G 2400/20* (2013.01); *C10G 2400/22* (2013.01); *C10G 2400/30* (2013.01)

(58) Field of Classification Search
CPC .............. C07C 1/20; C07C 1/22; C07C 1/24; B01J 29/06; B01J 29/40
USPC ......................................... 585/408, 469, 733
See application file for complete search history.

(56) References Cited

U.S. PATENT DOCUMENTS 4,621,161 A * 11/1986 Shihabi .......................... 585/408
4,847,223 A *  7/1989 Le Van Mao et al. ............ 502/62

FOREIGN PATENT DOCUMENTS

| EP | 0026963 A1 * | 6/1980 |
| EP | 1679286 A1 * | 7/2006 |

OTHER PUBLICATIONS

Costa et al., Ethanol to gasoline process: Effect of variables, mechanism, and kinetics, 1985, Industrial and Engineering chemistry process design and development, vol. 24, pp. 239-244.*

* cited by examiner

*Primary Examiner* — In Suk Bullock
*Assistant Examiner* — Youngsul Jeong
(74) *Attorney, Agent, or Firm* — Dickstein Shapiro LLP (57) ABSTRACT

In an attempt to conduct an effective conversion of bioethanol into gasoline rich in aromatics and iso-paraffins, a ZSM-5 type zeolite with special features such as nano crystalline size and acidity has been synthesized. The catalyst (NZ) exhibits highest gasoline yield of about 73.8 wt % with aromatics and iso-paraffins as major components. The product measures Research Octane Number (RON) of about 95, which is desirable for the gasoline specifications. Moreover, considerable amounts of the Liquefied Petroleum Gas (LPG) (15 wt %) and light olefins (14 wt %) are also formed as by-products that add value to the process. The nano crystalline ZSM-5 catalyst (NZ) exhibits the stability in activity in terms of bioethanol conversion and aromatics yields for the reaction time period of 40 h.

18 Claims, 7 Drawing Sheets

CATALYST AND PROCESS FOR THE CONVERSION OF BIO-ETHANOL INTO GASOLINE

FIELD OF THE INVENTION

The present application relates to a process for the preparation of gasoline. Particularly, the present application provides conversion of bioethanol into gasoline. More particularly, the application relates to effective conversion of bioethanol into the mixture of aromatics and branched paraffins falling in gasoline range hydrocarbons along with Liquefied Petroleum Gas (LPG) and light olefins ($C_2$-$C_4$) as valuable by-products.

BACKGROUND OF THE INVENTION

Currently, the main chemical compounds in industry are synthesized from petroleum resources. However, petroleum resources are limited and the combustion of petroleum products produces $CO_2$, a primary greenhouse gas. As an alternative to fossil fuel, increased interest in the biomass energy has developed. The biomass utilization could lead to the prevention of global warming because its combustion does not lead to an increase in $CO_2$ gas in the atmosphere. For example, the use of bioethanol, obtained from biomass/sugarcane, in gasoline blending has had positive effects such as reduction in vehicle emissions of gases like CO, $CH_4$, reduction in green house gases ($CO_2$), reduction of the dependence on petroleum products and imports of crude oil. Moreover, bioethanol replaces gasoline additives like MTBE and lead which are sources of surface and ground water contamination and dangerous to human health. However, bioethanol blending also has some negative effects such as increased emissions of aldehyde, known to be a human carcinogen, increased emissions of NOx, evaporative emissions and fuel consumption. There is concern for health as E10 (in India the gasoline blend contains 10% ethanol) vapor emissions will be greater than those from regular gasoline. Hence, it is preferable to convert bioethanol into aromatics and olefins which can be blended with gasoline or utilized for petrochemical production. One of the essential raw materials in the petrochemical industry is propylene, which is widely produced as a co-product of ethylene, by steam and thermal cracking of naphtha. However, this process is not optimal for the production of propylene. Thus, the development of propylene production processes from biomass resources such as bioethanol is highly desirable.

Aromatics are one of the basic raw materials in the chemical industry. Benzene (B), toluene (T) and xylenes (X), collectively known as BTX, are the most widely used aromatic hydrocarbons. The basic commercial processes for aromatic hydrocarbons production are solid-fuel process, pyrolysis and catalytic reforming, using crude oil. Now over 80% of aromatic hydrocarbons are produced by pyrolysis of tars and catalytic reforming, of which the feedstock is derived from crude oil. As an alternative to the use of crude oil, the catalytic aromatization of alcohols and ethers has generated a great deal of interest for the production of aromatic hydrocarbons. Catalytic conversions of methanol or diethyl ether (DEE) to gasoline (MTG) and light olefins (MTO) have been extensively studied. While new catalysts are being developed, known catalysts have been investigated for the production of aromatic hydrocarbons.

U.S. Pat. No. 4,698,452 describes the formation of ethylene from aqueous ethanol on mesopores ZSM-5 catalyst having Zn and Mn metals. However, these catalysts are not effective for the formation of aromatics/gasoline range products.

U.S. Pat. No. 4,621,164 describes the production of gaseous hydrocarbons from aqueous ethanol with various concentrations of water in presence of bifunctional ZSM-5 catalyst. However, the process is not aimed at producing material suitable for effective formation of aromatics.

U.S. Pat. No. 4,873,392 describes the production of ethylene from diluted ethanol on ZSM-5 bearing triflic acid and La metal at various reaction temperatures. However, this patent does not disclose the production of aromatics/gasoline range products.

U.S. Pat. No. 6,323,383 describes the formation of variety of chemicals such as ethylene, acetaldehyde, di-ethyl ether, 1-butanol and 1,3-butadiene from ethanol, over Ca, Cu, Fe loaded ZSM-5 catalyst. But, this process is not aimed at producing material suitable for aromatics production.

WO application 2009/098269 describes the dehydration of ethanol into ethylene and propylene with a pentasil zeolite based catalyst under various reaction conditions. However, this process does not describe the production of aromatics/gasoline range hydrocarbons.

US application 2006/0149109 describes the dehydration of ethanol and methanol into ethylene on a molecular sieve (SAPO) under various reaction conditions. However, this process does not describe the production of aromatics/gasoline range hydrocarbons.

US applications US 2011/0107662A1 and US 2011/0124927A1 describe a process for the conversion of ethanol first into syngas, followed by its conversion to one or more of methanol, ethanol, mixed alcohols and dimethyl-ethers, and eventually to gasoline in the final step. However, this process involves many intermediate compounds and multi reactor operations that limit the selectivity and yields of the gasoline.

U.S. Pat. No. 5,545,791 describes the conversion of lower aliphatic alcohol such as methanol to gasoline range hydrocarbons (mentioned as $C_5^+$ hydrocarbons) over Ti, Ni, Cu, Zn, Ag loaded ZSM-5 catalyst. But the process does not describe the composition of gasoline product with details such as aromatics, iso-paraffins, paraffins and naphthenes, which is indeed necessary to address the present fuel specifications to understand its quality and suitability for gasoline applications.

US application 2010/0174127 describes the conversion of diluted ethanol into LPG and gasoline over ZSM-5 catalyst which does not possess mesoporosity and nano crystal size. Moreover, the process operates at very low Weight Hourly Space Velocity (WHSV) (0.03 to 0.80) and under severe conditions that generally cause the rapid deactivation of the catalyst by coke deposition.

EP publication 0340061 and U.S. Pat. No. 4,847,223 describe the conversion of diluted aqueous ethanol into ethylene, over triflic acid incorporated onto ZSM-5 catalyst. However the process does not describe the formation of aromatics and LPG from ethanol.

WO application 2007/083241 describes the conversion of dilute ethanol into propylene and ethylene over solid acid catalyst in combination with various metal components such as Pb, Ca, Zn, Ag, Na, In, Ga and Ta. This process does not describe the formation of aromatics/gasoline range hydrocarbons.

The applications and patents described above focus on the formation of light olefins from aqueous ethanol. However, there remains a need for novel processes for the conversion of ethanol into high octane gasoline with LPG and olefins as valuable by-products.

OBJECT OF THE INVENTION

In one embodiment, the present application provides a process for the conversion of ethanol into high octane gasoline.

In one other embodiment, bioethanol is converted into aromatics/gasoline range hydrocarbons which can boost the octane number of the fuels, via a process using a nano-crystalline ZSM-5 zeolite catalyst.

In one other embodiment, the present application provides a process suitable for the production of aromatics with negligible concentration of benzene.

In one other embodiment, the present application provides a process suitable for production of light olefins as valuable by-product.

In one other embodiment, the present application provides a process suitable for production of Liquefied Petroleum Gas (LPG) range hydrocarbons as co-by product.

In one other embodiment, the present application provides a catalyst composition comprising a ZSM-5 zeolite for the production of aromatics and olefins from bioethanol.

In one other embodiment, the present application provides a catalyst for the production of gasoline range hydrocarbons with good octane number.

In one other embodiment, the present application provides a process for the production of aromatics with very low concentration of benzene.

In one other embodiment, the present application provides a catalyst with long time stability in activity towards conversion of bioethanol into gasoline.

SUMMARY OF THE INVENTION

Accordingly, the present application provides a process for the preparation of gasoline comprising:
 a) loading a catalyst in a reactor and loading extrudates of an inert material above and below the catalyst bed;
 b) introducing a feed in a continuous flow over the catalyst bed using an inert gas as carrier gas; and
 c) conducting the reaction at a temperature between 450° C.-500° C., under an atmospheric pressure between 0-2 bars and weight hourly space velocity (WHSV) between 2.6 $h^{-1}$-3.0 $h^{-1}$, to obtain liquid and gas products.

In an embodiment of the application, the catalyst is selected from the group comprising nano ZSM-5 zeolite containing the framework atomic silicon-to aluminium in a ratio of about 20 to about 200.

In a preferred embodiment of the application, the catalyst is nano ZSM-5 zeolite containing the framework atomic silicon-to aluminium in a ratio of about 30.

In another embodiment, the catalyst is nano ZSM-5 zeolite with nanosize crystals ranging between about 20 and about 150 nm.

In a preferred embodiment, the catalyst is nano ZSM-5 zeolite with nanosize crystals of about 30 nm.

In another embodiment, the catalyst is micro ZSM-5 zeolite containing the framework atomic silicon-to aluminium in a ratio of about 20 to about 200.

In a preferred embodiment, the catalyst is micro ZSM-5 zeolite containing the framework atomic silicon-to aluminium in a ratio of about 30.

In one embodiment, the feed is selected from the group comprising ethanol and bioethanol.

In still another embodiment, the inert material is α-alumina.

In still another embodiment, the inert gas is $N_2$.

In a preferred embodiment, the flow rate of the inert gas is about 30 lit/h.

In still another embodiment, the liquid product is a gasoline product containing major amounts of aromatics, isoparaffins and paraffin.

In still another embodiment, the gasoline product contains about 38 wt % to about 51 wt % of aromatics.

In a preferred embodiment, the gasoline product contains about 50 wt % of aromatics.

In still another embodiment, the gasoline product contains about 17 wt % to about 23 wt % of iso-paraffins.

In a preferred embodiment, the gasoline product contains about 22 wt % iso-paraffins.

In still another embodiment, the gasoline product contains about 3% to about 6 wt % of paraffins.

In a preferred embodiment, the gasoline product contains about 5.5 wt % of paraffins.

In still another embodiment, the gas product contains $C_1$-$C_4$ hydrocarbons in LPG range.

In still another embodiment, the LPG yield ranges from about 11 wt % to about 25 wt %.

In a preferred embodiment, the LPG yield is about 24.6 wt %.

In still another embodiment, the olefins yield ranges from about 13 wt % to about 30 wt % of valuable by-products along with the gasoline.

In a preferred embodiment, the olefin yield is about 29.5 wt % of valuable by-products along with the gasoline.

In still another embodiment, the catalyst exhibits stability in activity in terms of bioethanol conversion and aromatic yields for the minimum reaction time period of 40 h.

BRIEF DESCRIPTION OF THE DRAWING

The present application is illustrated in FIGS. 1 to 7 of the drawing(s).

8. Table 1 indicates the physico-chemical properties of NZ and MZ zeolite catalysts as described in example 2.

9. Table 2 indicates the overall performance of the various catalysts for bioethanol conversion as described in example 3.

10. Table 3 indicates the catalytic conversion of bioethanol over NZ zeolite catalyst with various framework atomic silicon-to aluminium ratio described in example 8.

DETAILED DESCRIPTION OF THE INVENTION

The present application provides a catalyst and a process for the conversion of bioethanol into gasoline. More specifically, the present inventors have discovered a ZSM-5 zeolite containing the framework atomic silicon-to aluminium ratio 30 exhibiting nano size crystals of 30 nm as a novel catalyst for the conversion of bioethanol into gasoline.

In an embodiment, a process for the preparation of catalyst ZSM-5 zeolite containing the framework atomic silicon-to aluminium ratio 30 exhibiting nano size crystals of 30 nm comprises:
a. preparing a sodium free homogenous gel mixture containing a silica component, an alumina component and a quaternary ammonium salt by sequentially mixing a silica source to the quaternary ammonium salt and adding an alumina source preferably at a temperature below 25° C.;
b. vigorously stirring the mixture for 8 h;
c. allowing the mixture to hydrolyze at 25° C. for 40 h;
d. heating the mixture at 80° C.;
e. heating the mixture at 140° C. for 2 days in a Teflon lined autoclave at autogenous pressure to obtain a solid acid material free of sodium with residual liquid;
f. separating the residual liquid by filtration;
g. thoroughly washing the solid with distilled water and suspending the solid in water;
h. centrifuging the solid and drying the solid at 25° C. for 12 h;
i. calcinating the solid at 550° C. for 4 h;
j. shaping the catalyst by mixing an inert alumina binder, preferably pseudo boehmite, in a zeolite:binder ratio of 3:2 by weight and adding a sufficient amount of mono basic acid and conducting wet of the resulting mixture through a 2 mm diameter size metallic syringe for the formation of wet extrudates; and
k. drying the wet extrudates at 25° C. for 12 h and calcination of the wet extrudates at 500° C. for 4 h.

The main advantages of the present process are:
a. Synthesis of NZ catalyst with enhanced porosity by a simple synthesis method.
b. The NZ catalyst prepared by this process can be used for effective catalytic conversion of bioethanol into gasoline range hydrocarbons with olefins and LPG as useful by-products.
c. The NZ having additional porosity (mesopores created by stacked packing of nano size crystals of ZSM-5) has exhibited enhanced production of gasoline (RON of 95) rich in aromatics and branched paraffins.
d. The NZ catalyst having strong acidity and mesoporosity for effective conversion of olefin intermediates into $C_5^+$ oligomers and their conversion to gasoline through HT reactions.
e. Gasoline contains very low concentration of benzene, high concentration of xylenes, toluene and iso-decane that makes its suitability for fuel applications.

Catalyst exhibits stability in activity in terms of bioethanol conversion and aromatic yields for the minimum reaction time period of 40 h.

The present application encompasses the development of a novel zeolite based catalyst which is suitable for the value addition of bioethanol for the production of gasoline range hydrocarbons along with considerable amounts of by-products such as Liquefied Petroleum Gas (LPG) and olefins. The catalyst exhibits almost 100% conversion of ethanol with as high as ~73 wt % yield to gasoline having Research Octane Number (RON) of about 95 in which the major components are iso-paraffins and aromatics. The low benzene content of the aromatic (gasoline) product makes advantage for its suitability for gasoline applications. The study also envisions the importance of the catalytic properties of ZSM-5 zeolite for the production of three individual product components vz, gasoline, olefins and LPG on three different catalyst formulations of ZSM-5.

The synthesis of the catalyst provides:
a. synthesizing nano crystalline ZSM-5 zeolite from facile and sodium free gel route and using a base material for the preparation of composite catalyst
b. controlling the hydrolysis of tetraethyl ortho silicate (TEOS) by reacting the template and alumina source at zero degree centigrade so as to obtain a well uniform size nano crystals of 30 nano meters for ZSM-5 zeolite
c. the crystallization occurs under autogenous pressure.
d. the addition of any promoters such as mixture of alcohol and hydrocarbons for crystallization is not required The catalytic conversion of bioethanol using nano crystalline ZSM-5 (NZ) zeolite catalyst provides:
a. having additional mesoporosity to facilitate improved accessibility to the active sites in the zeolite and the facile diffusion of the product molecules useful for the improved production of gasoline range hydrocarbons and olefins
b. production of gasoline range hydrocarbons with good octane number
c. production of LPG as valuable by-product from bioethanol
d. production of olefins as valuable by-products from bio-ethanol
e. NZ zeolite catalyst performance allows almost 100% conversion of bioethanol and an aromatics yield of about 50% over a period of 40 h The following examples are given by way of illustration of the present application and therefore should not be construed to limit the scope of the present application.

EXAMPLE 1

Synthesis of Nano ZSM-5 (NZ) Samples

This example illustrates the procedure for the preparation of the nano crystalline (homogenous 30 nanometers) ZSM-5 (NZ) zeolite catalyst containing the framework atomic silicon-to aluminium ratio 30. The NZ catalyst was obtained through preparation of a sodium ion-free homogenous gel where, 62.5 g of tetraethyl orthosilicate (TEOS, Merck consist of 30 wt % $SiO_2$) is added drop-wise to the 52.9 g of tetrapropyl ammonium hydroxide (TPAOH, Merck, 20 wt %) solution followed by drop-wise addition of 25 ml aluminum nitrate solution (prepared by dissolving 3.8 g of aluminum nitrate (Merck) in 25 ml of distilled water) at 0° C. temperature with vigorous stirring of the mixture for 6 h. After adding all the ingredients, the solution was left to hydrolyze at 25° C. for 40 h. The gel thus obtained was heated at 80° C. to evaporate water and ethanol formed during the hydrolysis of TEOS and the resultant viscous gel was treated 170° C. for 2 days in a Teflon lined autoclave at autogenous pressure. To obtain the solid acid material free of sodium but with the residual liquid, which was separated by filtration and the solid was thoroughly washed with distilled water for its purification. Typically no sedimentation was observed by keeping the solution as such for 2 days. Recovery of solids from this highly stable suspension was obtained by centrifuging at a very high speeds and times after diluting with water to lower the viscosity and pH, followed by its drying at 25° C. for 12 h and calcination at 550° C. for 4 h to remove the organic template used during the synthesis, so as to facilitate the creation of micropores in the zeolite crystals to obtain the zeolite powder.

Shaping of the catalyst is done by mixing an inert alumina binder (pseudo boehmite) with zeolite:binder ratio of 3:2 by weight, adding 3 volume % of glacial acetic acid (prepared by mixing 3 ml glacial acetic acid with 97 ml of distilled water) for peptization. Wet extrusion of the resultant paste was carried out through a 2 mm diameter size metallic syringe for the formation of wet threads, followed by their drying at 25° C. for 12 h and calcination at 500° C. for 4 h.

EXAMPLE 2

Synthesis of Micro ZSM-5 (MZ) Samples

In this synthesis 60 ml of sodium hydroxide solution (contains 2.4 g sodium hydroxide in water) was drop wise added to the 56.3 g $SiO_2$ solution (32 wt % silica in water, Merck), followed by the drop-wise addition of 10 ml tetra propyl ammonium hydroxide solution (contains 6.1 g of 40 wt % TPAOH, Merck) with constant stirring. To the resultant mixture 20 ml of aluminum nitrate solution (7.5 g of aluminum nitrate in water) was added drop-wise and the components were mixed with constant stirring at 25° C. The pH of the resulting gel was then adjusted to 10.5 by adding 1:1 H2SO4 solution before charging it in Teflon lined autoclave for hydrothermal synthesis at 180° C. for 3 days to obtain micro ZSM-5 (MZ).

EXAMPLE 3

Figure 1:
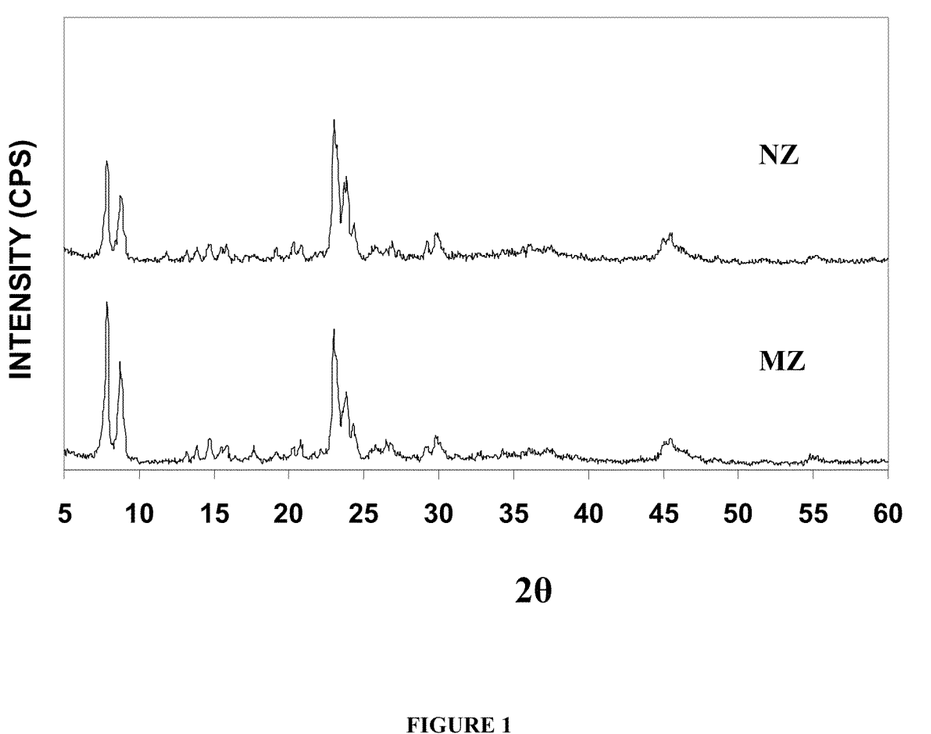
FIG. 1 is a plot of the 2 theta degree vs intensity of the x-ray diffraction patterns of the NZ and MZ zeolite catalysts as described in example 3.
Figure 2:
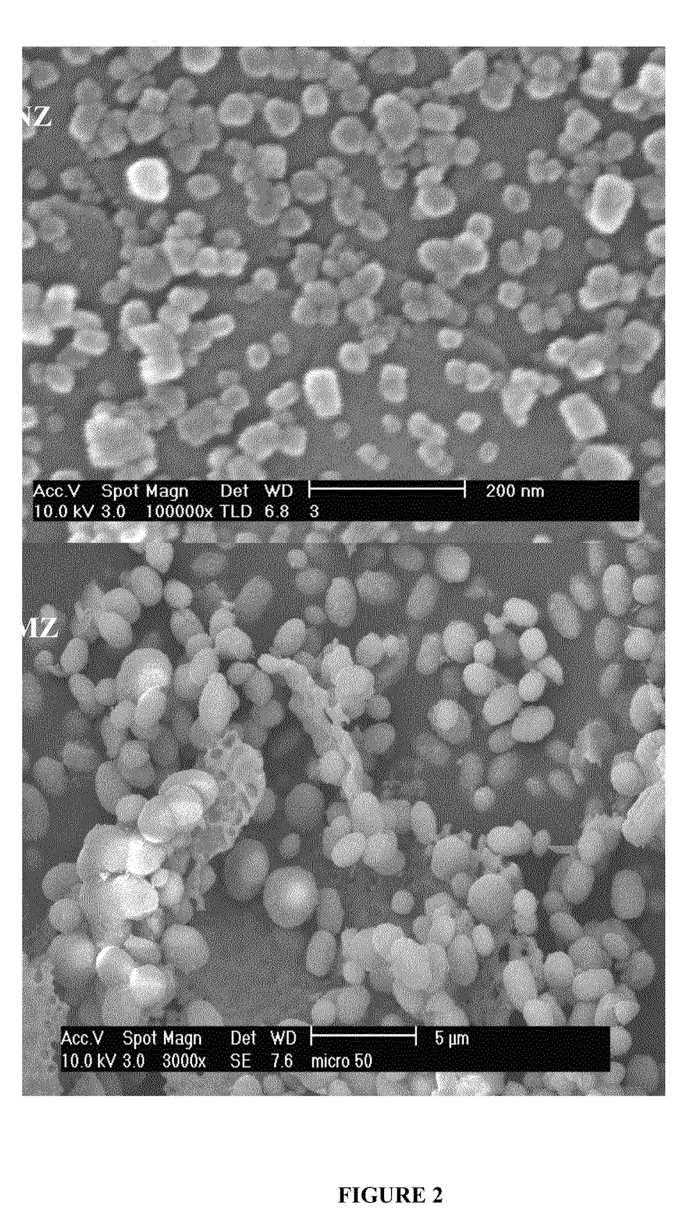
FIG. 2 is a picture of the scanning electron microgram obtained for NZ and MZ zeolite catalysts as described in example 3.

This example illustrates the physico chemical properties of synthesized nano crystalline ZSM-5 (NZ) and micro crystalline ZSM-5 (MZ) containing the framework atomic silicon-to aluminium ratio 30. The x-ray diffraction (XRD) patterns scanning electron microgram (SEM), surface area and pore volume are used for comprehend the textural proprieties of both zeolites. The XRD patterns given in FIG. 1 indicates a doublet at 6-10° 2θ along with a triplet at 22-25° 2θ representing the formation of ZSM-5 framework structure. A very low background signal and sharp reflection observed in the XRD patterns indicating excellent crystallinity of nano crystalline ZSM-5 zeolite, while the SEM in FIG. 2 indicates the formation of 30 nano meter crystals of nano ZSM-5. The table 1 indicates the surface area and pore volume of synthesized nano crystalline ZSM-5 and micro crystalline ZSM-5. Nano crystalline ZSM-5 exhibits the higher external surface area, total surface area, micropores area as well as total pore volume as compared with micro crystalline ZSM-5. On the basis of textural properties of nano crystalline ZSM-5 zeolite is used as catalyst for optimization of gasoline range hydrocarbons such as aromatics, iso-paraffins, along with olefins and LPG as valuable by-product from bioethanol.

TABLE 1

Physico chemical properties of nano crystalline ZSM-5 and micro crystalline ZSM-5

| Zeolites | BET surface area ($m^2/g$) | Micro pore (<20 Å) area ($m^2/g$) | External surface area ($m^2/g$) | Total pore volume ($cm^3/g$) | Micro pore volume ($cm^3/g$) |
|---|---|---|---|---|---|
| Micro crystalline ZSM-5 (MZ) | 345.7 | 255.8 | 89.9 | 0.1763 | 0.1022 |
| Nano crystalline ZSM-5 (NZ) | 461.1 | 322.9 | 138.2 | 0.3855 | 0.1321 |

| Volume ($Cm^3/g$) in pores of various diameters (Å) | | | | | |
|---|---|---|---|---|---|
| | <10 Å | 10-20 Å | 20-100 Å | 100-200 Å | 200-500 Å | >500 Å |
| Micro crystalline ZSM-5 (MZ) | 0.1262 | 0.0134 | 0.0143 | 0.0039 | 0.0079 | 0.0105 |
| Nano crystalline ZSM-5 (NZ) | 0.1637 | 0.0269 | 0.0176 | 0.0097 | 0.0220 | 0.1464 |

EXAMPLE 4

This example illustrates the catalyst performance studies towards the effective catalytic conversion of bioethanol into gasoline on NZ and MZ. The bioethanol (Bioethnaol Agro Industries Limited) conversion is conducted in a fixed bed down flow reactor (220 mm length and 18.5 mm internal diameter) by loading 5.0 g of catalyst in the centre of the reactor. Extrudates of α-alumina (inert material) were loaded above and below the catalyst bed. The feed was introduced in a continuous flow (16.6 ml/h) using Eldex syringe type feed pump. While using $N_2$ as carrier gas (30 lit/h) the reaction is conducted at 450 and 500° C. reaction temperature, atmospheric pressure and 2.6 $h^{-1}$ WHSV. The product obtained at the end of the reactor was cooled with the help of a cold water circulator, where the entire product was separated into two products, namely, liquid product (collected from down stream) and gas product (collected through a gas bulb by water displacement method).

The gas product was analyzed using Varian capillary column, CP $Al_2O_3$/KCl (50 m×0.53 mm×10 μm) that gives the analysis of $C_1$-$C_5$ hydrocarbons present in the product. The liquid product was analyzed using Petrocal DH, 100% dimethyl polysiloxane as stationary phase (100 m×0.25 mm×0.5 μm). Standard Test Method was used for detailed hydrocarbon group analysis, distribution of products and RON measure, where DHA (detailed hydrocarbon analysis) was obtained by using standard software Hydrocarbon Expert 4 (USA). The liquid product contains mainly Paraffins ($C_5$-$C_{10}$), i-Paraffins ($C_5$-$C_{10}$), Aromatics ($C_6$-$C_{10}$), Naphthenes ($C_5$-$C_{10}$), n-olefins ($C_5$-$C_9$), Iso-olefins ($C_5$-$C_{10}$), di-olefins ($C_5$-$C_7$) and Naphtheno-olefins ($C_5$-$C_7$), on the other hand gas product contains $C_1$-$C_5$ range paraffins, olefins and iso-paraffins hydrocarbons. The table 2 illustrates overall performance of catalysts for the production of various hydrocarbon components falling in gasoline, olefins and LPG range fuels from bioethanol

TABLE 2

Catalytic performance for bioethanol conversion on various catalysts

| | Catalysts | | | |
|---|---|---|---|---|
| | NZ | MZ | NZ | MZ |
| | Temperature (° C.) | | | |
| | 450 | 450 | 500 | 500 |
| GAS ANALYSIS (wt %) | | | | |
| Gas Yield (wt %) | 31.5 | 37.6 | 29.9 | 48.7 |
| Gas Composition | | | | |
| $C_1$ | 0.2 | 0.5 | 0.4 | 0.2 |
| $C_2^1$ | 7.5 | 4.7 | 2.7 | 6.5 |
| $C_2$ | 0.6 | 0.9 | 1.3 | 1.2 |
| $C_3^1$ | 5.4 | 4.4 | 3.4 | 12.6 |
| $C_3$ | 3.0 | 10.6 | 10.5 | 13.8 |
| $IC_4$ | 5.7 | 9.6 | 6.2 | 2.5 |
| $C_4$ | 2.3 | 4.4 | 2.6 | 0.8 |
| $C_4^1$ | 3.3 | 2.5 | 1.5 | 0.5 |
| $IC_5$ | 3.5 | — | 1.3 | 7.0 |
| $nC_5$ | — | — | — | 1.8 |
| $C_5^1$ | — | — | — | 1.8 |
| LIQUID ANALYSIS (wt %) | | | | |
| Liquid Yield (wt. %) | 68.5 | 62.4 | 70.1 | 51.3 |
| Liquid Composition | | | | |
| Paraffins | 1.0 | 0.3 | 1.7 | 1.1 |
| $C_5$ | 0.1 | 0.1 | 0.1 | — |
| $C_6$ | 0.1 | 0.1 | 0.1 | 0.0 |
| $C_7$ | 0.4 | 0.1 | 0.4 | 0.2 |
| $C_8$ | 0.4 | — | 0.8 | 0.3 |
| $C_9$ | — | — | 0.1 | 0.6 |
| $C_{10}$ | — | — | 0.2 | — |
| i-paraffins | 11.4 | 13.0 | 9.5 | 8.5 |
| $C_5$ | 0.4 | 0.7 | 0.2 | 0.1 |
| $C_6$ | 0.6 | 0.3 | 0.5 | 0.1 |
| $C_7$ | 0.8 | 0.4 | 0.7 | 0.2 |
| $C_8$ | 1.0 | 0.4 | 1.0 | 0.2 |
| $C_9$ | 0.7 | 0.1 | 0.1 | — |
| $C_{10}$ | 7.9 | 11.1 | 7.0 | 7.9 |
| Aromatics | 38.6 | 38.7 | 50.6 | 36.3 |
| $C_6$ | 0.5 | 0.9 | 2.5 | 1.1 |
| $C_7$ | 7.9 | 11.4 | 17.0 | 11.7 |
| $C_8$ | 24.0 | 26.1 | 27.5 | 22.3 |
| $C_9$ | 5.8 | — | 2.9 | 0.5 |
| $C_{10}$ | 0.4 | 0.3 | 0.7 | 0.7 |
| Naphthenes | 3.5 | 1.6 | 1.8 | 0.6 |
| $C_5$ | 0.1 | 0.1 | 0.1 | 0.0 |
| $C_6$ | 0.6 | 0.4 | 0.4 | 0.1 |
| $C_7$ | 0.8 | 0.6 | 0.5 | 0.2 |
| $C_8$ | 1.5 | 0.5 | 0.6 | 0.3 |
| $C_9$ | 0.1 | — | — | — |
| $C_{10}$ | 0.4 | — | 0.2 | — |
| n-Olefins | 0.4 | 0.1 | 0.9 | 0.0 |
| $C_5$ | 0.0 | — | 0.0 | 0.0 |
| $C_6$ | 0.3 | — | 0.1 | — |
| $C_7$ | 0.1 | 0.1 | 0.8 | 0.0 |
| $C_9$ | — | — | 0.0 | — |
| Iso-Olefins | 11.7 | 7.7 | 5.2 | 4.1 |
| $C_5$ | 0.4 | 0.1 | 0.2 | 0.0 |
| $C_6$ | 0.3 | 0.1 | 0.1 | 0.0 |
| $C_7$ | 0.8 | 0.3 | 0.2 | 0.1 |
| $C_8$ | 0.1 | 0.1 | — | 0.0 |
| $C_{10}$ | 10.1 | 7.1 | 4.7 | 4.0 |
| Di-Olefins | 0.1 | 0.0 | 0.1 | 0.0 |
| $C_5$ | 0.1 | — | 0.0 | — |
| $C_7$ | — | — | 0.1 | 0.0 |
| Naphtheno-Olefins | 1.1 | 0.2 | 0.1 | 0.2 |
| $C_5$ | 0.3 | — | — | 0.1 |
| $C_6$ | 0.8 | 0.2 | 0.1 | 0.1 |
| Others | 0.7 | 0.8 | 0.2 | 0.5 |
| Total | 100.0 | 100.0 | 100.0 | 100.0 |
| RON | 91.0 | 87.1 | 95.4 | 90.5 |

EXAMPLE 5

Figure 3:
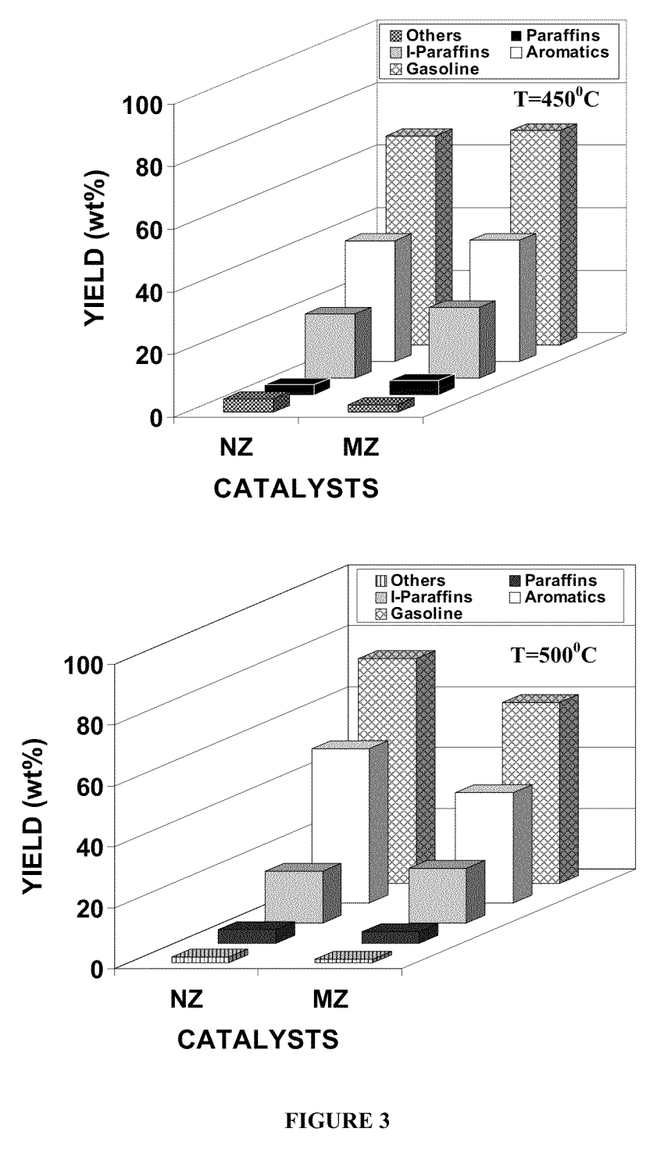
FIG. 3 is a plot of the NZ and MZ zeolite catalysts vs gasoline product distribution at 450° C. and at 500° C. as described in example 4.

This example illustrates the yield and composition of gasoline obtained on NZ and MZ. The FIG. 3 represents the gasoline distribution patterns over NZ and MZ catalysts at 450° C. and 500° C. reaction temperatures. The gasoline contains aromatics, paraffins ($C_4$-$C_{10}$), i-paraffins ($C_4$-$C_{10}$) and naphthenes range hydrocarbons. At lower reaction temperature (450° C.) both NZ and MZ exhibit comparable gasoline yield of ~67 wt % in which aromatics are ~38 wt %. However, at higher reaction temperature (500° C.) the NZ exhibits enhanced performance in terms of higher gasoline yield (73.8 wt. %) in which aromatics is 50.6 wt % and octane number (RON=95.4) when compared to the corresponding values of 59.2 wt %, 36.3 wt % and 90.5 on MZ that envisions the better hydrogen transfer and atomatization reactions on NZ at higher reaction temperatures to produce high quality product suitable for gasoline applications.

EXAMPLE 6

Figure 4:
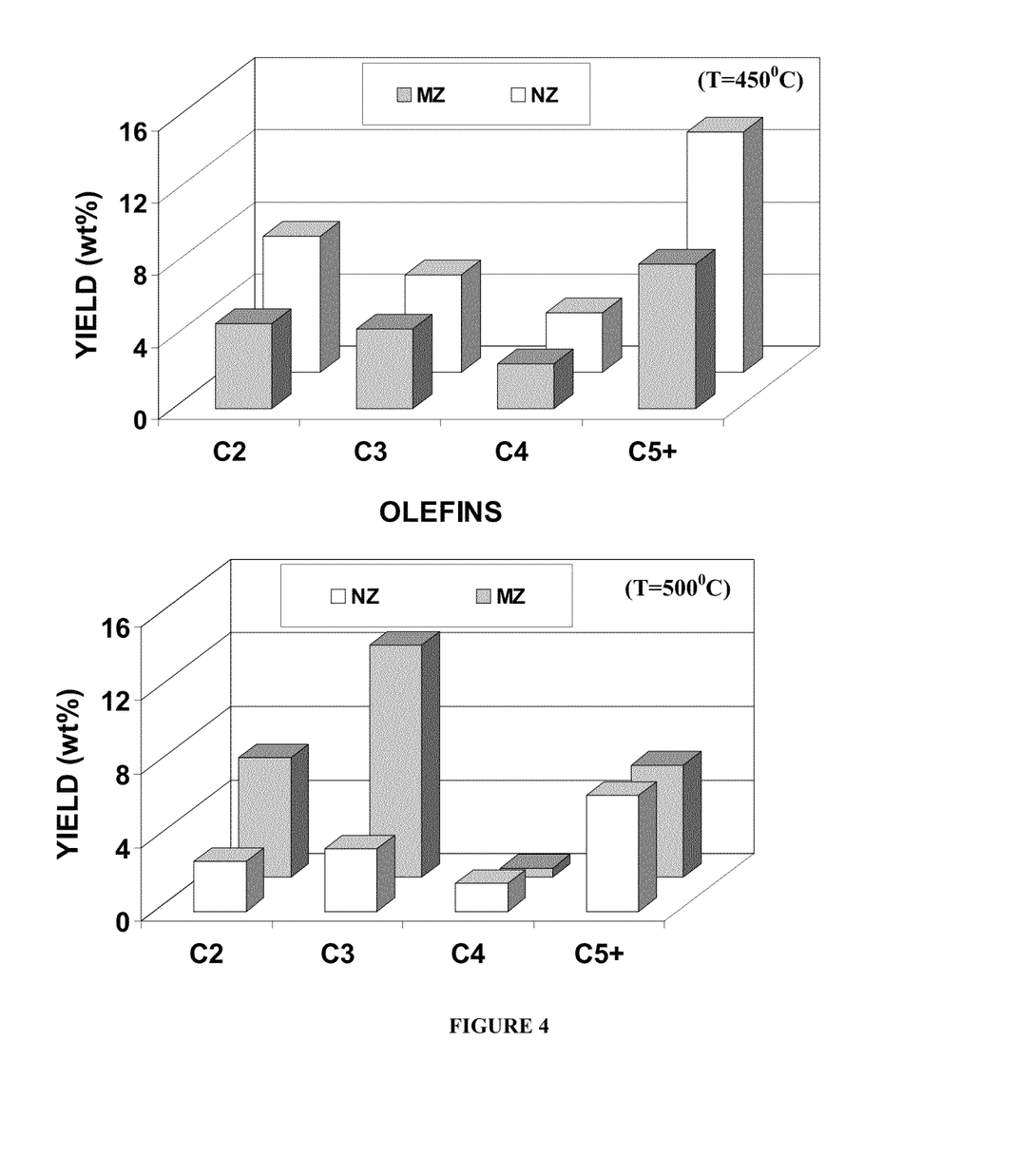
FIG. 4 is a plot of olefins distribution on NZ and MZ zeolite catalysts at 450° C. and at 500° C. as described in example 6.

This example illustrates the yields and distribution of olefins ($C_2$-$C_5$+) consist of n-olefins, iso-olefins, diolefins and naphtheno olefins. The performance of NZ and MZ catalysts at two reaction temperatures (450° C. and 500° C.) are given in FIG. 4. At low reaction temperature (450° C.) NZ catalyst exhibits the higher olefins yield (29.5 wt %) than the MZ catalyst (19.6 wt %). The $C_5^+$ olefins yield is also higher (13.3 wt %) on NZ catalyst compared to the MZ (8.0 wt %). However at higher reaction temperature (500° C.) catalyst MZ exhibited increase of olefins yield (25.7 wt %) along with the shift in olefin yield from $C_5^+$ olefins to propene suggests the additional cracking of $C_5^+$ olefins on MZ catalyst at high reaction temperature. In case of NZ catalyst also, the decrease in olefins yield (19.6 wt %) is observed at high reaction temperature, but this is reflected in increase of gasoline rather than gas product.

EXAMPLE 7

Figure 5:
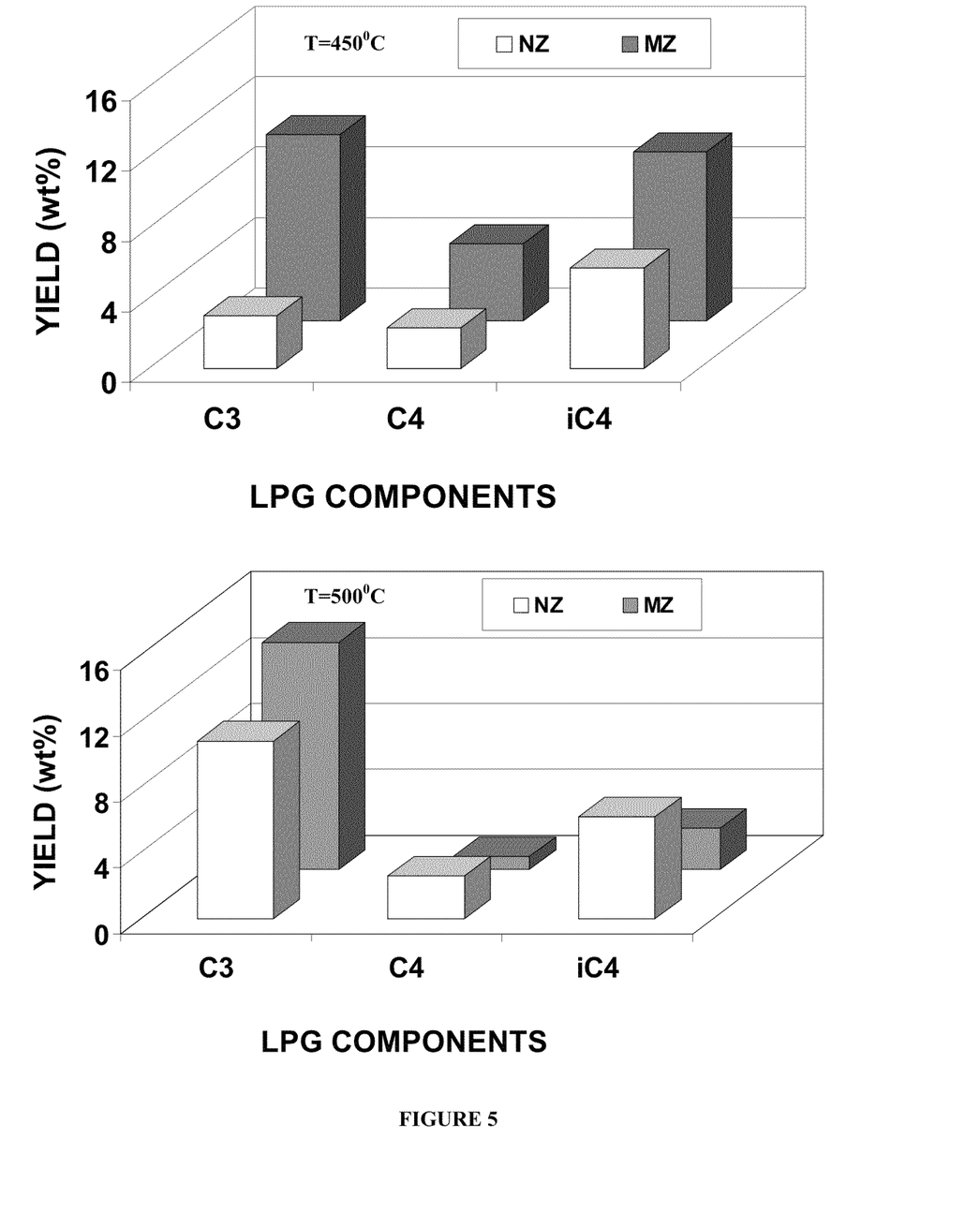
FIG. 5 is a plot of the LPG components vs yield at 500° C. on NZ and MZ zeolite catalysts as described in example 7.

This example illustrates the yields and distribution of Liquefied Petroleum Gas (LPG) components such as propane, butane and isobutane. The performance of NZ and MZ catalysts at two reaction temperatures (450° C. and 500° C.) are given in FIG. 5. At low reaction temperature (450° C.) MZ catalyst exhibits the higher LPG yield (24.6 wt %) than the NZ catalyst (11.0 wt %). However at higher reaction temperature (500° C.) catalyst NZ catalyst exhibited increase of LPG yield (19.6 wt %) as compare to MZ (17.1 wt %) catalyst.

EXAMPLE 8

Figure 6:
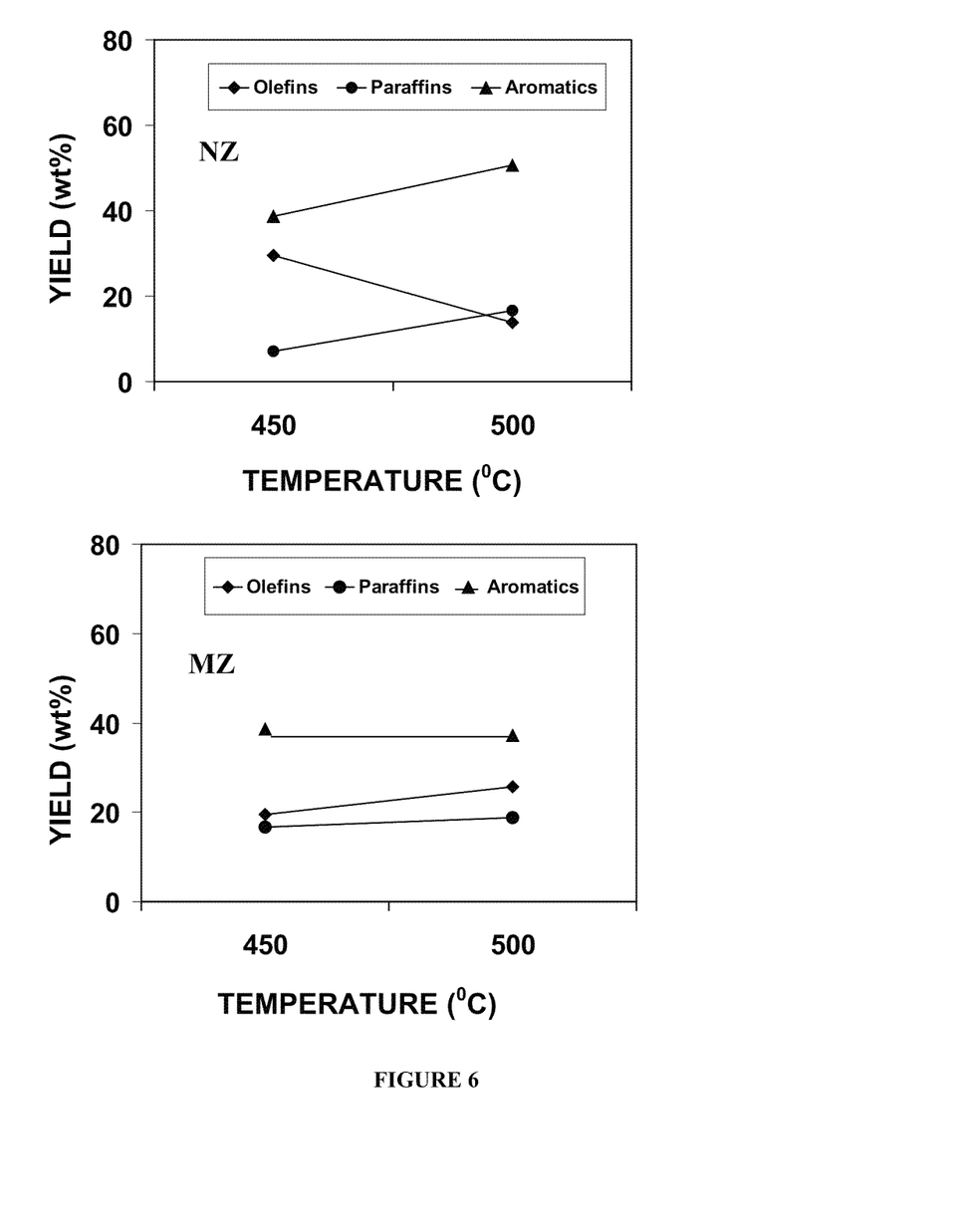
FIG. 6 is a plot for effect of reaction temperature on product distribution of olefins, paraffins and aromatics over NZ and MZ zeolite catalysts as described in example 8.

This example illustrates the hydrogen transfer ability of NZ and MZ catalysts in the aromatization reaction. Since, olefins are the source for the formation of oligomers and aromatics on one hand and they also accept hydrogen from naphthenic compounds to form aromatics and paraffins in the hydrogen transfer step, the distribution of olefins, paraffins and aromatics in the product can give idea about the hydrogen transfer ability of the catalysts. FIG. 6 shows the product pattern on NZ and MZ catalysts at two reaction temperature (450° C. and 500° C.). Increase reaction temperature caused decrease in olefins yield along with simultaneous increase of aromatics and paraffins in case of NZ catalyst, whereas this particular feature is absent on MZ catalyst, in spite of the comparable framework Si/Al ratios (30) of both MZ and NZ catalysts which envisions the additional role of enhanced hydrogen transfer played by mesopores in NZ catalyst in aromatics production.

EXAMPLE 9

This example illustrates the effect of framework Si/Al ratio of NZ catalyst, where, three NZ sample exhibiting 30, 90 and 150 Si/Al ratios are studied (designated as NZ-30, NZ-90 and NZ-150) for the conversion of bioethanol at 500° C. reaction temperature. The data given in Table 3 clearly indicates that the gasoline yield is decreasing while the olefins are simultaneously increasing with increasing of framework silicon-to aluminium ratio which means inefficient conversion of olefins to gasoline on higher Si/Al ratio of NZ (NZ-150). The studies indicate the superiority of the NZ-30 catalyst for the value upgradation of the bioethanol through gasoline production.

TABLE 3

Catalytic performance for bioethanol conversion on NZ catalyst with various silicon to aluminium ratios

| Catalyst | NZ-30 | NZ-90 | NZ-(150 |
|---|---|---|---|
| Conversions | 100.0 | 100.0 | 100.0 |
| Gasoline | 73.8 | 68.5 | 64.2 |
| Paraffins | 4.3 | 2.8 | 3.0 |
| Iso-paraffins | 17.0 | 17.4 | 18.3 |
| Aromatics | 50.6 | 47.6 | 41.7 |
| Others | 1.9 | 0.7 | 1.2 |
| Olefins | 13.9 | 15.6 | 17.4 |
| $C_2$ | 2.7 | 5.0 | 6.8 |
| $C_3$ | 3.4 | 3.8 | 4.4 |
| $C_4$ | 1.5 | 0.8 | 0.4 |
| $C_5^+$ | 6.3 | 6.0 | 5.8 |
| Others | 12.3 | 15.9 | 18.4 |
| Total | 100.0 | 100.0 | 100.0 |
| RON | 95.4 | 94.2 | 92.8 |

EXAMPLE 10

Figure 7:
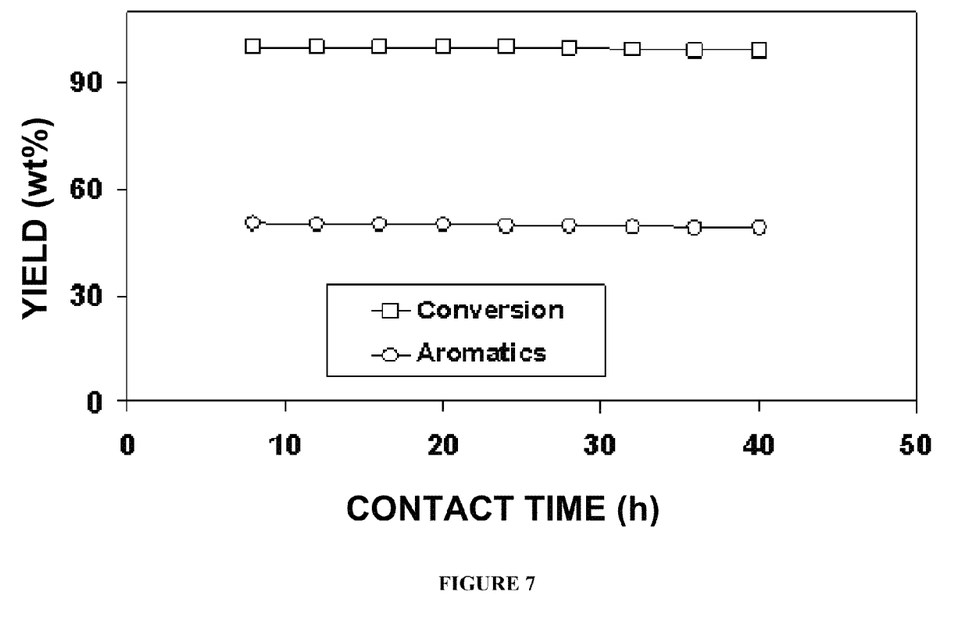
FIG. 7 is a plot of the reaction time vs ethanol conversion and aromatics yields over the promising catalyst (NZ) as described in example 9.

This example illustrates the stability in activity of NZ-30 catalyst in terms of bioethanol conversion and aromatics yields. Since the major gasoline component is aromatics, the aromatic content is used in this study as measure for assessing the catalyst performance at various traction times. Using $N_2$ as carrier gas the reaction is conducted at 500° C. reaction temperature, atmospheric pressure and 2.6 h$^{-1}$ WHSV. FIG. 7 clearly indicates that throughout the reaction time the catalyst exhibited the bioethanol conversion of almost 100% and aromatics yield of ~50% in the studied period of 40 h.

We claim:

1. A process for preparing gasoline comprising:
   a) loading a catalyst in a reactor, wherein the catalyst comprises nano ZSM-5 zeolite containing a framework atomic silicon-to aluminum in a ratio of 20 to 200, having nanosize crystals ranging about 30 nm, and loading extrudates of an inert material above and below a catalyst bed;
   b) introducing a feed consisting of ethanol, bioethanol, or a mixture thereof in a continuous flow over the catalyst bed using an inert gas as carrier gas; and
   c) conducting a reaction at a temperature between 450° C.-500° C., under an atmospheric pressure between 0-2 bars and a weight hourly space velocity between 2.6h$^1$-3.0h$^{-1}$, to obtain liquid and gas products, wherein the liquid product is a gasoline product comprising aromatics, isoparaffins and paraffins.

2. A process as claimed in claim 1, wherein the feed is bioethanol.

3. A process as claimed in claim 1, wherein the inert material is α-alumina.

4. A process as claimed in claim 1, wherein the inert gas is $N_2$.

5. A process as claimed in claim 1, wherein a flow rate of inert gas is in a range of 25-35 liter/h.

6. A process as claimed in claim 1, wherein the gasoline product comprises 38 wt % to 51 wt % of aromatics, 17 wt % to 23 wt % of iso-paraffins, and 3 to 6 wt % of paraffins.

7. A process as claimed in claim 1, wherein the gas product obtained comprises liquefied petroleum gas (LPG) and olefins.

8. A process as claimed in claim 7, wherein an LPG yield ranges from 11 wt % to 25 wt % and an olefins yield ranges from 13 wt % to 30 wt %.

9. A process as claimed in claim 1, where in the catalyst exhibits stability in activity in terms of feed conversion and aromatic yields for the minimum reaction time period of at least 40 h.

10. A process as claimed in claim 6, wherein the gasoline product comprises 50 wt % of aromatics, 22 wt % of iso-paraffins, and 5.5 wt % of paraffins.

11. A process as claimed in claim 8, wherein the LPG yield is 24.6 wt % and the olefins yield is 29.5 wt %.

12. A process as claimed in claim 1, wherein the catalyst comprises nano ZSM-5 zeolite containing a framework atomic silicon-to-aluminum in a ratio of about 30.

13. A process as claimed in claim 6, wherein the gasoline product has a research octane number (RON) of about 91 to about 95.

14. A process as claimed in claim 6, wherein the liquid product yield is about 67 wt % to about 74 wt %.

15. The process of claim 1 wherein the temperature is above 450° C.

16. The process of claim 1, wherein the temperature is about 500° C.

17. The process of claim 1, wherein the temperature is above 450° C.

18. The process of claim 1, wherein the temperature is about 500° C.

* * * * *